(12) United States Patent
Bazzo et al.

(10) Patent No.: US 11,780,140 B2
(45) Date of Patent: Oct. 10, 2023

(54) CONTROL SYSTEM AND METHOD OF AN INJECTION MOLDING APPARATUS OF PLASTIC MATERIALS

(71) Applicant: INGLASS S.p.A., San Polo di Piave (IT)

(72) Inventors: Maurizio Bazzo, San Polo di Piave (IT); Massimo Rossi, San Polo di Piave (IT)

(73) Assignee: INGLASS S.p.A.

(*) Notice: Subject to any disclaimer, the term of this patent is extended or adjusted under 35 U.S.C. 154(b) by 0 days.

(21) Appl. No.: 17/839,867

(22) Filed: Jun. 14, 2022

(65) Prior Publication Data

US 2023/0139974 A1    May 4, 2023

Related U.S. Application Data

(62) Division of application No. 17/251,850, filed as application No. PCT/IB2019/054760 on Jun. 7, 2019, now Pat. No. 11,390,002.

(30) Foreign Application Priority Data

Jun. 26, 2018    (IT) .................. 102018000006688

(51) Int. Cl.
  *B29C 45/80*    (2006.01)
  *B29C 45/28*    (2006.01)

(52) U.S. Cl.
  CPC ............ *B29C 45/80* (2013.01); *B29C 45/281* (2013.01); *B29C 2045/2865* (2013.01); *B29C 2945/7627* (2013.01); *B29C 2945/76083* (2013.01); *B29C 2945/76568* (2013.01); *B29C 2945/76595* (2013.01); *B29C 2945/76749* (2013.01); *B29C 2945/76859* (2013.01)

(58) Field of Classification Search
  CPC ................. B29C 45/281; B29C 45/80; B29C 2045/2865
  See application file for complete search history.

(56) References Cited

U.S. PATENT DOCUMENTS

| | | |
|---|---|---|
| 5,055,026 A | 10/1991 | Gordon |
| 2004/0115295 A1 | 6/2004 | Schunck et al. |
| 2015/0158227 A1 | 6/2015 | Schreyer et al. |

FOREIGN PATENT DOCUMENTS

| | | |
|---|---|---|
| CN | 102865271 A | 1/2013 |
| JP | 2002106505 A | 4/2002 |

OTHER PUBLICATIONS

International Search Report dated Sep. 9, 2019. 13 pages.
Chinese Office Action dated Jan. 20, 2022. 11 pages.

*Primary Examiner* — James Sanders
(74) *Attorney, Agent, or Firm* — RMCK Law Group PLC

(57) ABSTRACT

A system and method for controlling an actuator which actuates an axially displaceable pin valve of an apparatus for injection molding of plastic materials, where the control system includes an electronic control unit of the actuator which adjusts at least one among position, speed and acceleration of the pin valve, and a position sensor which detects a position of a plunger of the actuator and is operatively connected to the electronic control unit. The position sensor indirectly detects the position of the plunger of the actuator.

4 Claims, 3 Drawing Sheets

CONTROL SYSTEM AND METHOD OF AN INJECTION MOLDING APPARATUS OF PLASTIC MATERIALS

CROSS-REFERENCE TO RELATED APPLICATIONS

This application is a divisional application of U.S. Ser. No. 17/251,850, filed Dec. 14, 2020, which is a 371 National Stage of International Application No. PCT/IB2019/054760, filed Jun. 7, 2019, which claims priority to Italian Patent Application No. 102018000006688, filed Jun. 26, 2018. The disclosure of each of the above applications is incorporated herein by reference in its entirety.

FIELD OF THE INVENTION

The present invention regards apparatus for injection moulding of plastic materials of the type comprising at least one injector provided with a pin valve that is axially displaceable between an advanced closing position and a receded opening position for the flow of plastic material towards the cavity of a mold. Typically, the pin valve of the injector is driven by means of an actuator which can be of the electric or fluid type.

More in particular, the invention regards the case where the actuator is of the fluid type (hydraulic or pneumatic) and specifically it regards the control of the actuator and, correspondingly, of the pin valve of the injector.

STATE OF THE ART

In the electronic control systems of the actuator of the injector, a programmable control unit is operatively associated to the delivery and discharge electro-valve circuit of the actuator and it is configured to adjust at least one among the position, speed and acceleration of the pin valve. The electronic control unit is in turn operatively connected to a position sensor which detects the position of the plunger of the actuator.

An arrangement thus made is described and illustrated for example in document US-2015/0158227: the position sensor is physically applied to the cylinder of the fluid actuator and thus it is capable of directly detecting the position of the plunger.

This arrangement reveals various drawbacks.

Firstly, the need for providing the molding apparatus with specific actuators that incorporate the relative position sensors and which are relatively expensive. Furthermore, should the sensors fail, there normally arises the need for replacing the entire actuator.

Secondly, if planning to upgrade the molding apparatus thereof without electronic control, implementing it by adding the electronic control unit, the user should necessarily replace the fluid actuators thereof with those provided with position sensors.

Despite the fact that documents US 2004/15295 and U.S. Pat. No. 5,055,026 provide for indirectly detecting the position of the plunger of the actuator, they offer poorly effective solutions.

SUMMARY OF THE INVENTION

The object of the present invention is to overcome the aforementioned drawbacks, and such object is primarily obtained through a system for controlling a fluid actuator, comprising a cylinder and a plunger which actuates an axially displaceable pin valve of an injector in an apparatus for injection molding of plastic materials of the type defined above, wherein the position sensor indirectly detects the position of the plunger of the actuator, whose peculiar characteristic lies in the fact that the position sensor is arranged at a remote position with respect to the actuator, and more in particular it is operatively associated to a movable member actuated simultaneously with the actuator, for example consisting of the plunger of an auxiliary fluid jack inserted into the delivery and discharge circuit of the actuator. The position of the plunger of the auxiliary fluid jack detected by the position sensor will thus be proportional to the stroke of the pin valve of the injector, and the signals transmitted by the position sensor to the electronic control unit will allow to manage the position and/or the speed and/or the acceleration of the pin valve during the injection as a function of the programming of such electronic unit.

The control system according to the invention reveals the advantage of being flexible, in that it can be adapted to any type of fluid actuator even previously existing in a molding apparatus. Furthermore, the position sensor can be installed in any position—even remote—and thus more easily accessible, such as for example on the mold, on board the pressing machine and even in a position outside the pressing machine of the molding apparatus. Besides making the position sensor easily accessible in case of failure, such positioning keeps the apparatus away from high temperatures thus attaining greater reliability and precision of the entire electronic control.

The position sensor is also advantageously suitable to manage, by means of an electronic control unit, the stop of the actuator should the pin valve be at an intermediate position between a full closing position and a maximum opening position, and it is also suitable to serve as an end-stop for the movement of said pin valve, as well as detect possible leakages of the fluidic circuit of the actuator.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

Figure 1:
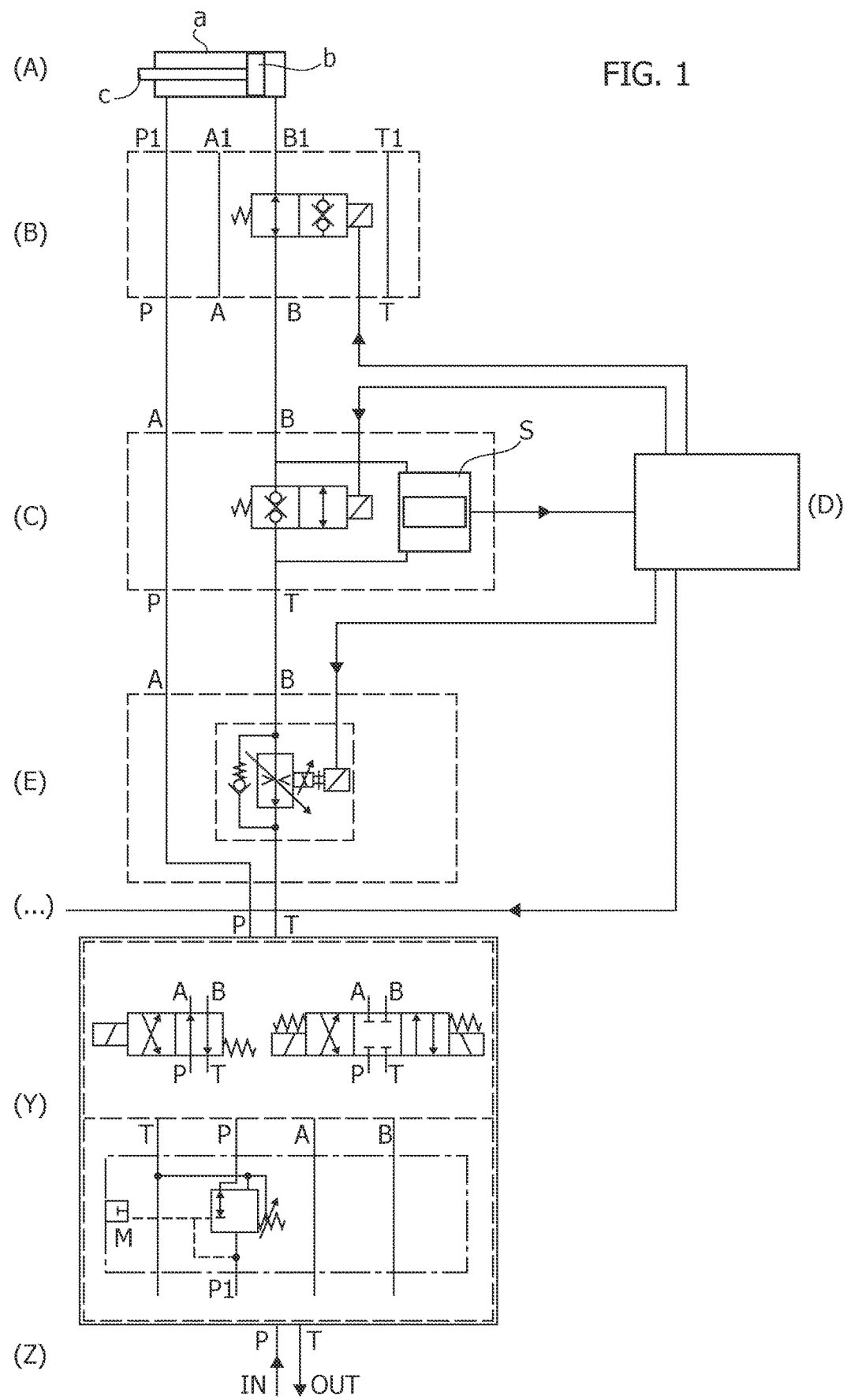
FIG. 1 is a diagram showing the application of the position sensor according to the invention to a first example of an electrical-hydraulic circuit for the actuation of an actuator of an injector.

Initially referring to FIG. 1, following is a summary description of an example of a control system of an injector of an apparatus for injection molding of plastic materials, comprising—in a per se known manner (and thus not illustrated in detail)—a nozzle in which the pin valve is axially displaceable between an advanced full closing position and a receded maximum opening position of the flow of the plastic material from a hot runner to the cavity of a mold. Generally, an apparatus thus made can for example be of the type described and illustrated in the previously mentioned document US-2015/0158227.

The displacement of the pin valve of the injector is obtained by means of a fluid actuator A including a cylinder a and a plunger b whose stem c is directly or indirectly connected to the pin valve of the injector. The actuator A, pneumatic or hydraulic, is of the double-acting type and it is connected to a delivery line P and to a return line T of a pressurised fluid, which mutually invert alternatingly depending on the displacement direction of the plunger b of the actuator and thus of the pin valve of the injector. The fluid, in the hydraulic case described herein, is supplied and discharged by a distribution unit schematised by section Y of the circuit, in turn connected to the delivery P and discharge T (section Z). The section Y may take various configurations, schematically illustrated, as a function of the needs and requests of the user of the molding apparatus.

Arranged between the actuator A and the distribution section Y are three sections B, C and E, all connected to a programmable electronic control unit D.

The section B includes a block solenoid valve by means of which the actuator A, and thus the pin valve of the injector, can be stopped in at least one intermediate position between the full closing position and the maximum opening position.

The section E includes a flow rate adjustment solenoid valve by means of which it is possible to control the displacement speed of the plunger b of the actuator A, and thus the speed of the pin valve of the injector. In the example described herein, the section E allows to adjust the displacement of the pin valve at a single constant speed, programmable by means of the control unit D.

The section B comprises a block solenoid valve which, upon command by the control unit D, stops the stroke of the plunger b of the actuator A, and thus the stroke of the pin valve of the injector, in at least one intermediate position between the full closing and maximum opening positions.

The section C, interposed in this case between the sections B and E, includes—according to the invention—a position sensor generally indicated with S which indirectly detects the position of the plunger b of the actuator A, and thus of the pin valve of the injector.

The expression indirect is used to indicate, in the description and in the claims that follow, the fact that the position sensor S is separated from the actuator A and it can thus be arranged in a remote position and spaced from the hot runner: for example on the mold, or on board the pressing machine or even outside the pressing machine of the molding apparatus.

Figure 3:
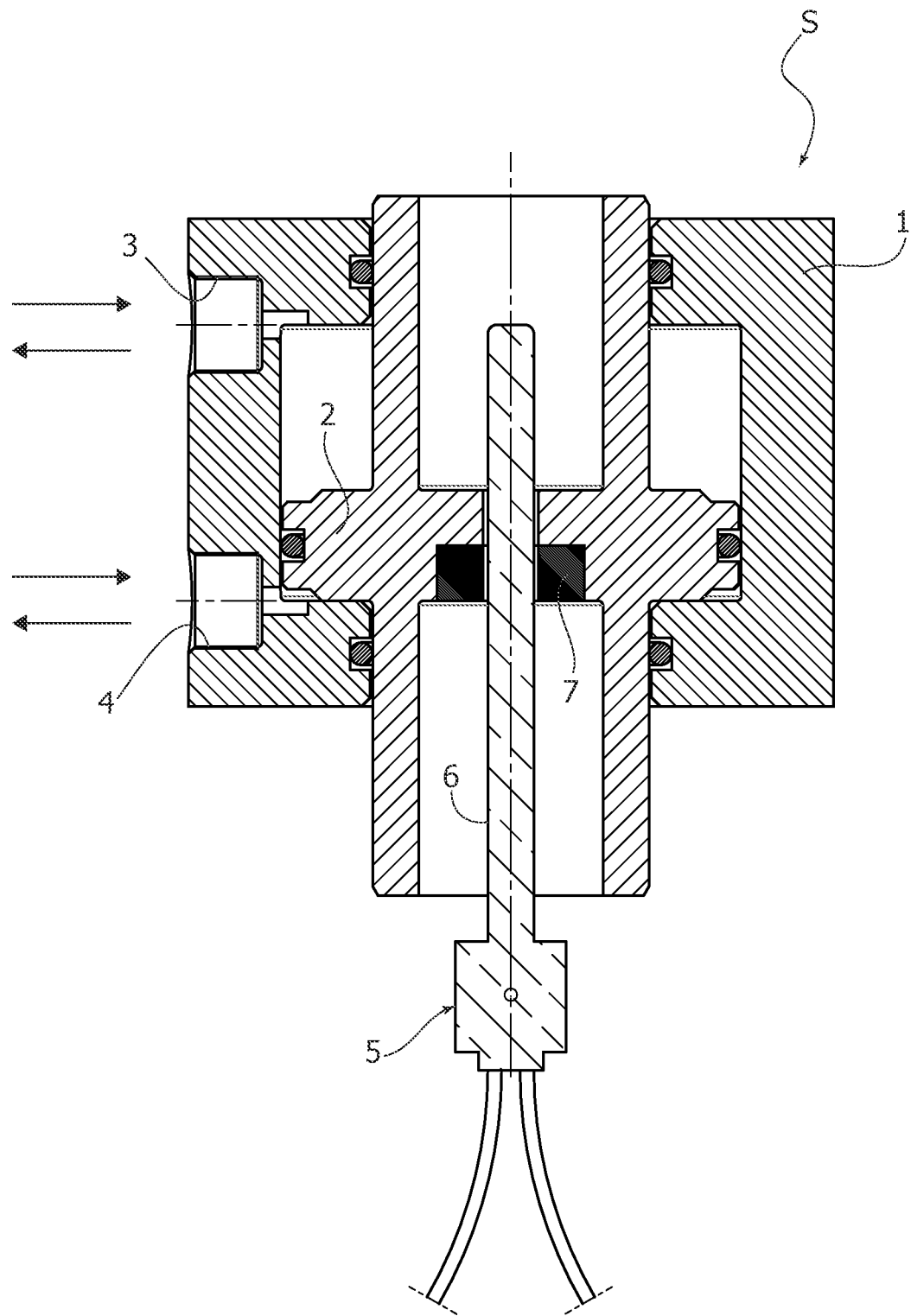
FIG. 3 is a sectional schematic view of an embodiment of the position sensor.

As illustrated in detail in FIG. 3, the position sensor S consists of an auxiliary hydraulic circuit consisting of a cylinder 1 displaceable in which is a plunger 2 which delimits—in the cylinder—two chambers each of which is provided with a respective inlet/outlet 3, 4 connected to the hydraulic circuit of the actuator A. A linear position transducer 5, comprising a stem 6 slidable on which is an annular displaceable contact 7 carried by the plunger 2, is operatively connected to the electronic control unit D for indicating the position of the plunger 2 and thus, indirectly, the position of the pin valve of the injector.

The inlets/outlets 3, 4 of the auxiliary fluid jack S are connected—as mentioned—to the hydraulic circuit of the actuator A by means of a solenoid valve provided for in the section C, also controlled by the electronic control unit D, as outlined hereinafter.

Upon filling the hydraulic circuit, the solenoid valve of the section C is opened by the electronic unit D to allow the fluid to enter into the two chambers of the auxiliary hydraulic jack S filling them with oil and emptying them of air. At the end of this step, the solenoid valve of the section C is shut.

Subsequently carried out is a reset step, during which the actuator A is actuated to take the plunger b and thus the pin valve of the injector to the full closing position and then to maximum opening position, so as to respectively identify the origin and the maximum of the displacement. This step offers the possibility of being able to use the same position sensor S in molding systems provided with different actuators A.

During the normal regime operation, the hydraulic circuit oil will flow with reciprocating motion displacing the plunger 2 of the auxiliary hydraulic jack S proportionally to the stroke of the plunger b of the actuator A. The transducer 5 will detect the instantaneous position of the plunger 2 transmitting the relative signal to the electronic control unit D which will process it and use it to manage the electric controls of the various solenoid valves of the circuit so as to control the position, the speed and possibly the acceleration of the pin valve of the injector in a programmed fashion.

Figure 2:
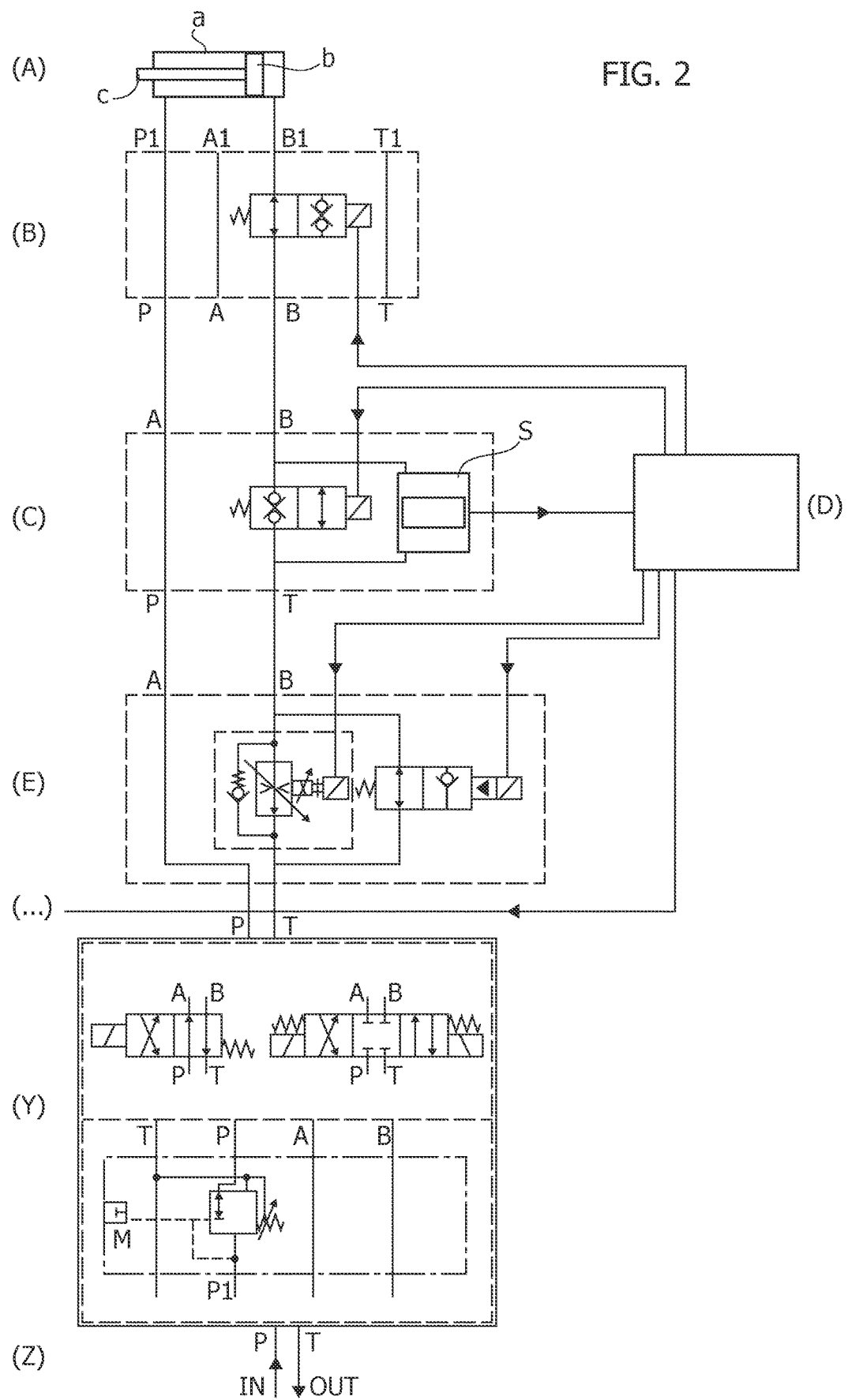
FIG. 2 is a diagram similar to FIG. 1 of a second example.

The variant of the hydraulic diagram represented in FIG. 2 is analogous to the embodiment described with reference to FIG. 1 and it differs from the latter solely due to the fact that the section E is configured so that the displacement speed of the pin valve adjusted by the electronic unit D can be double instead of single.

The advantages deriving from the invention, and specifically in that the position sensor S is physically separated from the actuator A, are summarised hereinafter:

maximum flexibility, due to the possibility of being able to adapt to different types of actuators, of any size and manufacturing, possibility of remote-positioning and thus not affected by the high temperatures of the hot runner of the apparatus, possibility for the position sensor S to also serve as an end-stroke for the actuator A, capacity to detect and signal even possible leakages in the fluidic circuit of the actuator A, possibility of subsequently implementing, i.e. application of the electronic control even to previously existing molding apparatus, without having to directly intervene on the actuator of the or of each injector.

Obviously, the construction details and the embodiments, in particular as regards the configuration of the position sensor and relative transducer described above by way of example, may widely vary with respect to what has been described and illustrated, without departing from the scope of protection of the present invention as described in the claims that follow.

In particular, the indirect detection at a remote position could be actuated—instead of by means of the plunger of the auxiliary hydraulic jack—by a different mechanical device or device of any other nature, known to a man skilled in the art, capable of performing the same function.

The invention claimed is:

1. A method for controlling an actuator which actuates an axially displaceable pin valve of an injector in an apparatus for injection molding of plastic materials, wherein the actuator is a fluid jack having a cylinder and a plunger and wherein an electronic control unit of the actuator adjusts at least one among position, speed and acceleration of the pin valve of the injector, the method comprising:

(i) indirectly detecting a position of the plunger of the actuator at a remote position via a position sensor operatively connected to said electronic control unit, and (ii) detecting any leakages of a delivery and discharge circuit of the actuator, wherein the position sensor is operatively associated to a movable member actuated simultaneously with the actuator and includes a plunger of an auxiliary fluid jack inserted in the delivery and discharge circuit of the actuator and located at a remote position with respect to said actuator.

2. The method of claim 1, wherein the position sensor comprises a linear position transducer operatively associated to the plunger of the auxiliary fluid jack.

3. The method of claim 1, further comprising the position sensor being configured for detecting an end of stroke movement of the pin valve.

4. The method of claim 1, wherein said position sensor is configured to detect and signal leakages in the delivery and discharge circuit of said actuator.

* * * * *